United States Patent [19]

Shionoya

[11] Patent Number: 4,696,550
[45] Date of Patent: Sep. 29, 1987

[54] INTENSITY CONTROL OF EXCITATION MEANS OF THERMALLY ADDRESSED DISPLAY

[75] Inventor: Toshio Shionoya, Kanagawa, Japan

[73] Assignee: Sony Corporation, Tokyo, Japan

[21] Appl. No.: 814,611

[22] Filed: Dec. 30, 1985

[30] Foreign Application Priority Data

Dec. 29, 1984 [JP] Japan ............................ 59-278509

[51] Int. Cl.$^4$ ............................................ G02F 1/137
[52] U.S. Cl. .................................................... 350/351
[58] Field of Search ........................................ 350/351

[56] References Cited

U.S. PATENT DOCUMENTS

| 4,150,396 | 4/1979 | Hareng et al. | 350/351 |
| 4,561,727 | 12/1985 | Heeks | 350/351 |

FOREIGN PATENT DOCUMENTS

| 0087477 | 9/1982 | European Pat. Off. | |
| 3415638 | 4/1984 | Fed. Rep. of Germany | |
| 0145654 | 12/1978 | Japan | 350/351 |
| 1507182 | 6/1974 | United Kingdom | |
| 2140023 | 4/1984 | United Kingdom | |

OTHER PUBLICATIONS

Armitage "Numerical Solution of Heat Flow in the Laser Addressed Liquid Crystal Display", J. Appl. Phys. vol. 52, No. 7, Jul. 1981, pp. 4843–4851.
Lu et al, "Thermally and Electrically Addressed Dye Switching LCD's", Mol. Crys. Liq. Crys., vol. 94, 1983, pp. 167–189.
Dewey et al, "A 2000–Character Thermally Addressed Liquid Crystal Projection Display", SID 77 Digest Conference: Boston, Mass. 19–21, Apr. 1977, pp. 108–109.
Cunningham, "Visual Display Unit Using Laser Scanning and Liquid Crystal Cell", IBM Technical Disclosure Bulletin, vol. 19, No. 8, pp. 3179–3181.
IBM Journal of Research and Development, vol. 26, No. 2, pp. 177–185, Mar. 1982.
Electronics Review–Thermal Cycling Activates, Freezes Liquid-Crystal Display–Nov. 30, 1981–pp. 39–40–3.

*Primary Examiner*—John K. Corbin
*Assistant Examiner*—David Lewis
*Attorney, Agent, or Firm*—Hill, Van Santen, Steadman & Simpson

[57] ABSTRACT

A liquid crystal display apparatus in which an image to be displayed is written in the liquid crystal cell by irradiating it with a laser beam and in which the image thus written is enlarged and projected on a screen by optical projection means and wherein the invention the amount of energy supplied to a spot in the liquid crystal cell in which an image is to be produced is increased when writing is not and will not be done in immediately preceding and succeeding spots so that the image writing in the liquid crystal cell can be completed within a shorter time.

8 Claims, 3 Drawing Figures

INTENSITY CONTROL OF EXCITATION MEANS OF THERMALLY ADDRESSED DISPLAY

BACKGROUND OF THE INVENTION

1. Field of the Invention

The invention relates in general to a liquid crystal display apparatus in which the display image is written into a liquid crystal cell by irridating the cell with a laser beam and in which the image is enlarged and projected on a screen by optical means. Particularly, the invention relates to an apparatus in which the writing time into the liquid crystal cell is reduced so as to improve the quality of the display.

2. Description of the Prior Art

Previously, liquid crystal display apparatuses have been known in which the characters or the display images are written into the liquid crystal cell by irridating the cell with the laser beam and the image is then enlarged and displayed on the screen by optical projection means consisting of a light source, lens and a filter.

In such liquid crystal display apparatuses, image writing in the liquid crystal cell is achieved using the following principle. The laser beam is irridated on the liquid crystal cell for converting the laser beam energy into thermal energy. The heat thus generated is used to heat the liquid crystal to cause a phase transition in the heated spot of the cell. As the irridation of the laser beam is terminated, the liquid crystal tends to revert to its starting phase. However, the liquid crystal spot that has undergone a phase transition cools rapidly so the disrupted state of the molecular disposition of the liquid crystal caused by the phase transition is maintained and the light scattering center may remain in the liquid crystal spot. This causes the image to be stored or written into the spot.

More specifically image writing can be achieved by turning the laser beam on and off in a controlled manner with simultaneous scanning for sequentially writing picture elements or pixels that are the minimum size unit of the image. The laser beam can be scanned by the so-called raster scanning and vector scanning. In raster scanning, the laser beam is scanned linearly from, for example, the left side end towards the right side end of the liquid crystal cell and when the beam reaches the right side end of the cell it is promptly returned to the left side end but at a position slightly below the starting point for the preceding scanning line. The beam again resumes linear scanning towards the right side end of the cell and this sequence is repeated vertically from the top toward the bottom of the cell. In vector scanning, the laser beam is scanned randomly.

It should be noted that when the image is written into the liquid crystal cell by the described raster scanning, that the state of the image writing in a given cell spot corresponding to one pixel depends substantially on whether the writing is also performed in the immediately preceding and succeeding cells on the same scanning line. That is, when writing is also accomplished in the two adjacent blocks of the particular block being considered, more string writing is obtained for the same amount of energy supplied to the intermediate spot, that is, the product of the laser output multiplied by the writing time necessary for writing in a spot corresponding to each pixel than in the case in which the writing is not performed in any of the immediately adjacent spots. This is because the heat received by the immediate adjacent spots will be transmitted to the intermediate spot in which writing is to be effected, thus, facilitating writing in the intermediate spot. It will be noted that the scanning speed of the laser beam depends on the writing time per spot which is usually set to a constant value. In other words, for an equivalent writing quality a larger energy is required in the case where writing did not occur in the immediately adjacent spots than for the case where writing occurs in one or both of the immediately adjacent spots.1

Thus, it has been conventional practice to set the scanning speed of the laser beam by taking as a reference the case of the greatest difficulty of writing which is the case in which writing is not accomplished in any of the immediately adjacent spots. However, this results in a prolonged writing time for each liquid cell. On the other hand, when the scanning speed of the laser beam is set by taking as a reference the case of the greatest ease of writing, that is, the case in which writing is performed in one or both of the immediately adjacent spots, the writing time per liquid crystal cell is produced. However, for this case, the optimum writing is not acheived in the spot in which the writing is to be effective, thus resulting in a lower display quality. For this case, an optimum writing is possibly achieved by increasing the laser output, however, since the laser unit usually employed for writing is a semiconductor laser which is used at a constant laser output of 30 mW which is the presently available maximum power, it has not been feasible to increase the output of the laser unit.

SUMMARY OF THE INVENTION

In the light of the foregoing description, it is an object of the present invention to provide a liquid crystal display apparatus in which the image writing into the liquid crystal cell can be achieved in a shorter time without lowering the display quality.

The present invention resides in the broadest aspect in a liquid crystal display apparatus in which writing into the liquid crystal is accomplished with the aid of a laser beam characterized by means for deciding that the writing is effected in a spot on the liquid crystal corresponding to a pixel based on the information of whether writing was accomplished in any of the immediately adjacent spots and means responsive to the decision means for increasing the amount of energy supplied to the spot if writing did not occur in any of the immediately adjacent spots.

According to the present invention, if it has been decided in the decision means that writing was effected in a desired spot corresponding to a pixel but was not accomplished in any of the two spots adjacent to the desired spot, the amount of energy supplied to the spot in which writing is to be accomplished is increased in a manner such that the optimum writing can be achieved although the scanning speed of the laser beam is set by taking as a reference the case in which writing is effected in one or both of the immediately adjacent spots.

The above and other objects, features and advantages of the present invention will become apparent from the following detailed description of the illustrative embodiments when read in conjunction with the accompanying drawings in which like reference numerals represent the same or similar elements.

DETAILED DESCRIPTION OF THE PREFERRED EMBODIMENTS

Figure 1:
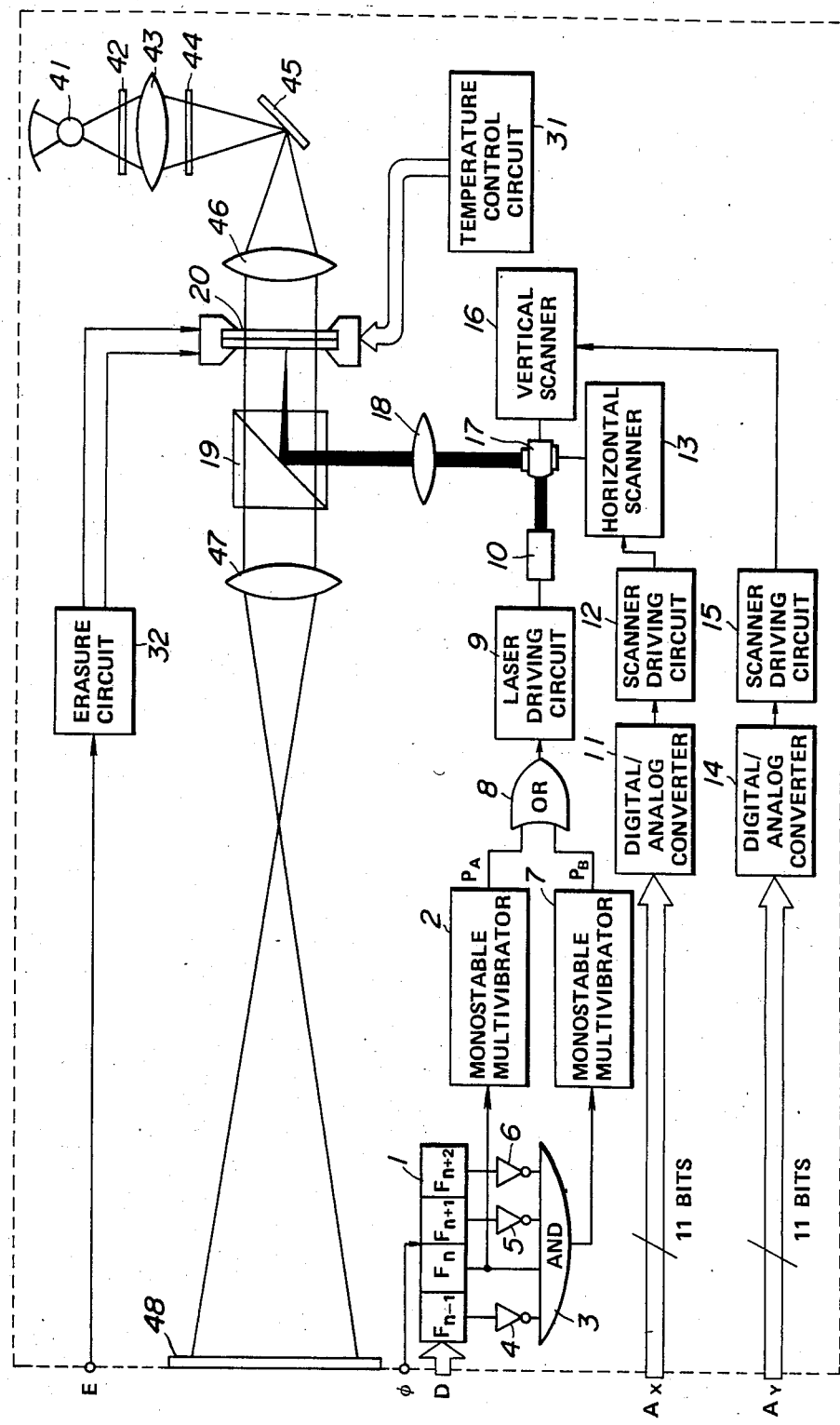
FIG. 1 is a block diagram showing an embodiment of the liquid crystal display apparatus according to the present invention.

FIG. 1 illustrates a liquid crystal display apparatus of the present invention wherein the image data D for each spot corresponding to a pixel of the image to be written or supplied to a shift register which has four stages $F_{n-1}$, $F_n$, $F_{n+1}$ and $F_{n+2}$ and which is driven by clock signals $\phi$. The stage $F_n$ of the shift register 1 is coupled to a monostable multivibrator 2 and is also coupled to an AND circuit 3. The stages $F_{n-1}$, $F_{n+1}$ and $F_{n+2}$ of the shift register 1 are connected through inverters 4, 5 and 6 to the AND circuit 3 and the output of the AND circuit 3 is connected to a monostable multivibrator 7 which acts as a means for enhancing the energy supplied to a spot Sn which will be later described.

The shift register 1, the inverters 4, 5 and 6 and the AND circuit 3 comprise the discrimination or decision determining means. The monostable multivibrator 2 produces output write pulses $P_A$ which pulses have a pulse width or duration corresponding to one pixel or spot. Multivibrator 7 produces as write pulses $P_B$ pulses which have pulse width equal to, for example, 1.4 times that of the write pulses $P_A$. The outputs of the monostable multivibrators 2 and 7 are connected through OR circuit 8 to a laser driving circuit 9 which drives a writing laser diode 10.

The laser diode 10 is a GaAlAs semiconductor laser which has an output of, for example, 30 mW and produces near infrared light having a wave length equal to 780 nm. In the present embodiment, the laser diode 10 is used with a constant maximum output of 30 mW.

Horizontal address data $A_X$ are supplied to a digital to analog converter D/A 11 which is connected to a scanner driving circuit 12 which in turn is connected to a horizontal scanner 13. Vertical address data $A_Y$ are supplied to a D/A converter 14 which is connected to a scanner driving circuit 15 which is connected to a vertical scanner 16.

The laser beam emitted from the laser diode 10 impinges upon a galvano mirror 17 which is driven by the horizontal and vertical scanners 13 and 16 so as to deflect the laser beam horizontally and vertically for scanning. This laser beam from the galvano mirror 17 passes to a prism 19 through a lens 18 and is deflected at right angles by the prism 19 and falls on a liquid crystal cell 20 which has an area of 16 mm times 16 mm. Thus, 2,000 pixels can be written horizontally and vertically so that a total of 2,000 times 2,000 pixels can be written into the liquid crystal cell 20.

Figure 2:
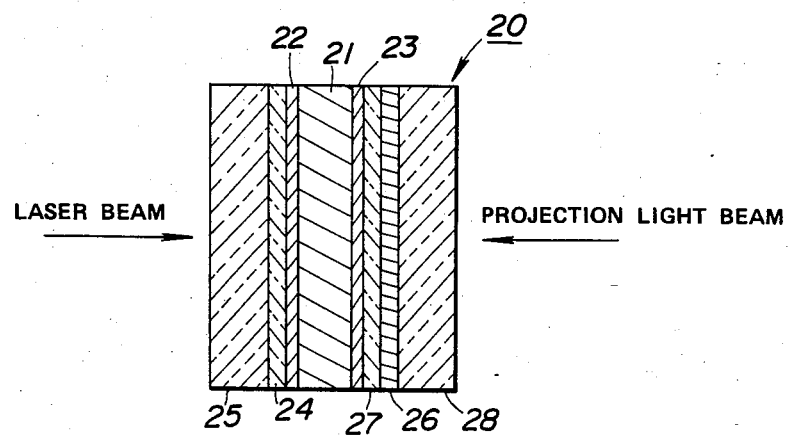
FIG. 2 is a sectional view showing the structure of the liquid crystal cell in the embodiment of FIG. 1.

FIG. 2 illustrates in cross-section the structure of the liquid crystal cell 20 which is comprised of a liquid crystal layer 21, a pair of orientation coating layers 22 and 23 which are mounted on both sides of the liquid crystal 21 and a glass plate 25 on which a transparent electrically conductive coating 24 such as ITO film is applied by vacuum deposition, and a second glass plate 28 which has a cold filter coating 26 for reflecting the laser beam and on which a transparent electrically conductive coating 27 is applied by vacuum deposition are mounted in sandwich form as illustrated in FIG. 2.

The glass plate 25 has its transparent conductive coating 24 disposed on the orientation coating layer 22 of the liquid crystal layer 21 and the second glass plate 28 has its transparent conductive coating 27 disposed on the other orientation layer 23 of the layer 21. The laser beam is received from the left side of the glass plate 25 as illustrated in the FIG. The liquid crystal layer is comprised of a liquid crystal having a smectic A phase with an addition as dyestuff of 1, 3 -di (1, 4 - dimenthyl - 7 - isopropyl azulenyl) cyclobutenediillium which is described in copending Japanese patent application No. 73322/1983 assigned to the assignee of the present application. Addition of the dyestuff results in a more efficient absorption and transmission of the laser beam to the liquid crystal. The cyanobiphenyl type liquid crystal consisting of essentially of a mixture of, for example, 40 mol. percent of octylcyanobiphenyl and 60 mol. percent of decylcyano biphenyl may be used as the liquid crystal. Such liquid crystal changes in the crystal state and undergoes a phase transition through the smectic A phase, nematic phase and isotropic phase with changes in the temperature and thus on the absorption of the laser beam. For example, the first phase transition temperature from the smectic A phase to the nematic phase is 44.8° C., and the second phase transition temperature from the nematic to the isotropic phase is 45.2° C.

As shown in FIG. 1, the liquid crystal cell 20 is held by a temperature control circuit 31 at a bias temperature of 43.3° C. which is lower for example by 1.5° C. than the first phase transition temperature of the liquid crystal which is 44.8° C. Therefore, in the normal state, that is in the preparatory state for writing the display image, the liquid crystal of the liquid crystal layer 21 is held in the smectic phase A. An erasure signal E is supplied to an erasure circuit 32 which applies an AC field across the transparent conductive coating layers 24 and 27 of the liquid crystal cell 20 so as to erase previously written images.

The display image written into the cell 20 is projected by the following optical projection means. The projection light beam from a halogen lamp 41 which may be 150 watt lamp passes to a mirror 45 through an infrared filter 42, condensor lens 43, and an ultraviolet filter 44 and is reflected by the mirror 45 so as to irradiate the cell 20 through a lens 46 from the side of the glass plate 28. The light beam which passes the cell 20 reaches the screen 48 through the prism 19 and a projection lens 47. In this manner, the image written on the cell is enlarged and is projected onto the screen 48.

Figure 3:
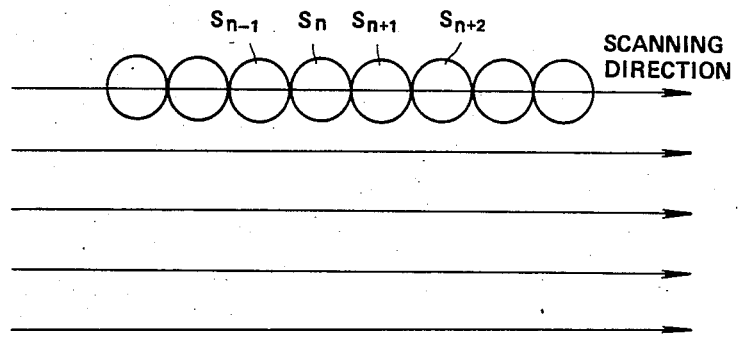
FIG. 3 is a schematic plan view showing the spot on the liquid crsytal cell so as to accomplish image writing.

FIG. 3 illustrates the method of writing the image in the liquid crystal display device. It is assumed that the scanning direction of the laser beam is as indicated by the arrow and writing is at the spot indicated by Sn. When the image data D corresponding to the spot Sn is "0" that is, when the contents of the stage Fn of the shift register 1 is "0", no pulse outputs are supplied from the multivibrators 2 or 7 and no pixel writing occurs at the spot Sn. In this case, it is not necessary to consider the contents of the other stages $F_{n-1}$, $F_{n+1}$ and $F_{n+2}$ of the shift register 1.

When the image data D corresponding to the spot Sn is "1" that is, when the contents of the stage $F_n$ of the shift register 1 is "1", a writing pulse or writing pulses are supplied from both of the multivibrators 2 and 7 or from only the multivibrator 2 for pixel writing of the spot Sn. Specifically, the contents of the other stages $F_{n-1}$, $F_{n+2}$ and $F^{n+2}$ of the shift register 1 determined in a manner such that when the contents of one or more of such stages are "1", that is when pixel writing has been accomplished not only in the spot Sn but in at least one of the spots $S_{n-1}$, $S_{n+1}$ and $S_{n+2}$, a writing pulse $P_A$ having a pulse width corresponding to one pixel or spot is produced at the output of the monostable multivibrator 2 and is delivered to the laser driving circuit 9 through the OR circuit 8. The laser driving circuit 9 causes the laser diode 10 to be turned on for a period corresponding to the duration of the writing pulse $P_A$ for writing the pixel in the spot Sn in the liquid crystal cell 20.

On the other hand, when the contents of the stages $F_{n-1}$, $F_{n+1}$ and $F_{n+2}$ of the shift register 1 are all zero, that is, when the pixels have not been written in any of the spots $S_{n-1}$, $S_{n+1}$ and $S_{n+2}$, but must be written in the spot $S_n$, write pulses $P_A$ will be output from the monostable multivibrator 2 and the write pulse $P_B$ having a pulse width equal to for example 1.4 times that of the write pulse $P_A$ is produced at the output of multivibrator 7 and is supplied to the laser driving circuit 9 through the OR circuit 8. Pulse $P_B$ is longer than the pulse $P_A$ in pulse width. Due to operation of the laser driving circuit 9, the laser diode 10 will be turned on during the time interval corresponding to the pulse width of the write pulse $P_B$ for writing the pixel in the spot Sn of the cell 20. Thus, in the present case, the time interval of the laser beam irradiation will be longer than in the case in which the pixels are written in at least one of the spots $S_{n-1}$, $S_{n+1}$ and $S_{n+2}$ so that the energy applied to the spot $S_n$ is increased during writing. The condition that the pixel is not written in the spot $S_{n+2}$ as well is required because any pixel written in the spot Sn is likely to affect the adjoining spot $S_{n+1}$ to cause the spot $S_{n+1}$ to collapse. When the pulse width of the write pulse $P_B$ is set to a proper value, it is not necessary to take the spot $S_{n+2}$ into consideration.

Therefore, even if the scanning speed of the laser beam is adjusted by taking as a reference the case of the greatest ease of image writing of the spot $S_n$, that is the case in which writing is accomplished in at least one of the spots $S_{n-1}$, $S_{n+1}$ $S_{n+2}$ also, an optimum image writing can be achieved in the spot Sn in the case of the utmost difficulty in image writing of the spot Sn, that is, the case in which image writing is not accomplished in any of the spots $S_{n-1}$, $S_{n+1}$ and $S_{n+2}$. Therefore, the time interval of image writing into the liquid crystal cell 20 can be reduced without lowering the display quality. More specifically, the writing time per pixel can be reduced in the present invention for example to 2.5 microseconds from the writing time of 4.3 microseconds in the conventional prior art system. Therefore, with the blanking time for horizontal scanning of the laser beam equal to 1 msec the time necessary for writing, for example, 2,000×2,000 pixels can be reduced to 12.0 seconds in the present invention from 19.2 seconds which is necessary for conventional prior art systems and this results in a reduction of 7.2 seconds in the writing time according to the present invention while maintaining the same quality of display.

It will be noted that since the laser diode 10 is employed in the present example at the constant maximum output of 30 mW, the amount of energy to be applied to the spot Sn into which the image writing is to be accomplished is controlled by changing the time of the irridation of the laser beam. However, when there is a sufficient supply of the laser output available from the laser source, the laser output can be changed so as to control the amount of energy applied to the spot. In addition, the present invention can also be applied to the image writing by vector scanning.

The above description is for a single preferred embodiment of the invention, however, it will be apparent that many modifications and variations can be effected by one skilled in the art without departing from the spirit or scope of the novel concepts of the invention which should be determined only by the appended claims.

I claim as may Invention:

1. A liquid crystal display apparatus in which writing into the liquid crystal cell is done with a laser beam, comprising decision means for deciding that writing is to be done in a spot in a liquid crystal cell corresponding to a picture element wherein writing did not occur in any of the immediately adjacent spots and for deciding the amount of energy supplied to said spot, and means responsive to the output of said decision means for increasing the amount of the energy supplied to the spot in which the writing is to be done said decision means takes into consideration that writing will not occur on only the one spot immediately and only two spots immediately succeeding said spot.

2. A liquid crystal display apparatus according to claim 1 wherein said liquid crystal has orientation layers provided on both sides thereof and the resulting composite sheet is sandwitched between a glass plate having transparent conductive layer deposited thereon by evaporation and a second glass plate having a cold filter coating adapted for reflecting the laser beam and a transparent conductive layer deposited thereon by evaporation.

3. A liquid crystal display apparatus according to claim 2 wherein the liquid crystal layer comprises a liquid crystal having a smectic A phase which is supplemented by a dyestuff material.

4. A liquid crystal display apparatus according to claim 1 wherein said means for deciding includes a shift register, an inverter and an AND circuit.

5. A liquid crystal display apparatus according to claim 1 wherein said energy increasing means increases the time of irradiation by the laser beam on said spot so as to increase the amount of the energy supplied to said spot in the liquid crystal cell in which the image writing is to be done.

6. A liquid crystal display apparatus in which writing into the liquid crystal is done with a laser which scans said display apparatus comprising decision means which decides if a picture element is to be written into by said laser and also determines the amount of energy which is to be used to write into said picture element from information as to whether adjacent picture elements are to be or have been written into by said laser, a laser driving circuit connected to said decision means, and said laser controlled by said laser driving circuit.

7. A liquid crystal display apparatus according to claim 6 wherein said decision means comprises a multistage shift register which receives incoming write information, a first monostable multivibrator with a first time period connected to one stage of said shift register, at least two inverters connected to other stages of said shift register adjacent said one stage, an AND gate connected to said one stage and said two invertors, a second monostable multivibrator with a second time period connected to said AND gate and said laser driving circuit connected to said first and second multivibrators.

8. A liquid crystal display apparatus according to claim 7 including an OR gate connected between said first and second monostable multivibrators and said laser driving circuit.

* * * * *